United States Patent [19]

Hirao et al.

[11] 3,784,175

[45] Jan. 8, 1974

[54] DOWNCOMER FOR FLUID CONTACTOR APPARATUS

[75] Inventors: Shoichi Hirao, Kakogawa; Satoshi Ihara; Kanji Ueda, both of Ashiya, all of Japan

[73] Assignee: Seitetsu Kagaku Co., Ltd., Miyanishi, Harimacho, Kako-gun, Hyogo-ken, Japan

[22] Filed: Sept. 14, 1971

[21] Appl. No.: 180,378

[30] Foreign Application Priority Data
Dec. 9, 1970  Japan.............................. 45-109766

[52] U.S. Cl. ... 261/114 R, 261/114 JP, 261/114 VT
[51] Int. Cl. ............................................... B01d 3/20
[58] Field of Search ................... 261/114 R, 114 A, 261/114 JP, 114 VT

[56] References Cited
UNITED STATES PATENTS

| | | | |
|---|---|---|---|
| 1,353,685 | 9/1920 | Walker...................... | 261/114 R X |
| 1,765,087 | 6/1930 | Mase......................... | 261/114 A UX |
| 2,290,055 | 7/1942 | Kinsey................................ | 261/110 |
| 3,103,545 | 9/1963 | Korelitz........................... | 261/114 R |

*Primary Examiner*—Dennis E. Talbert, Jr.
*Attorney*—Craig et al.

[57] ABSTRACT

A downcomer for a fluid contactor apparatus comprises a vertical passage having an opening at the upper end thereof, which consists of a movable member and a fixed member, or consists only of movable members. Said movable member is supported on the fixed member or on the other fixed parts in a manner to be tilted and an area for discharging an effluent of the downcomer can be automatically changed according to a fluctuation in fluid load.

12 Claims, 9 Drawing Figures

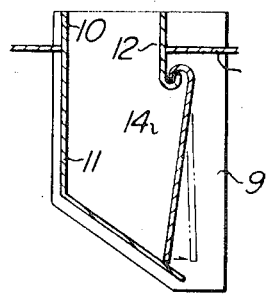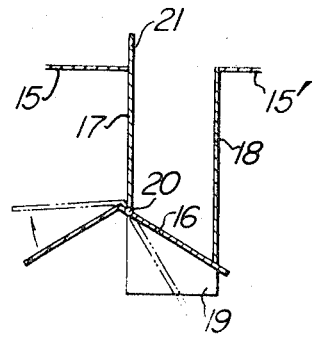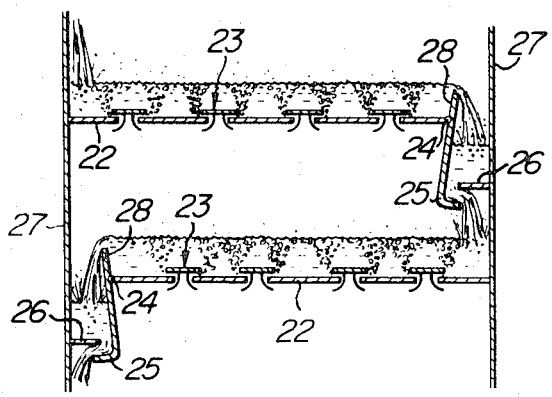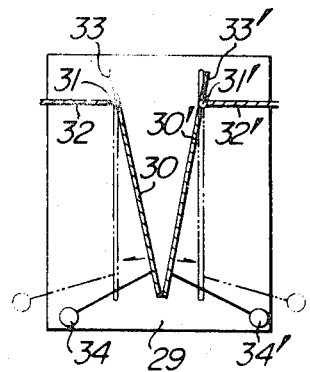

DOWNCOMER FOR FLUID CONTACTOR APPARATUS

This invention relates to a novel structure of a downcomer for a fluid contactor apparatus, and more particularly to a downcomer to be provided in a fluid contactor apparatus, which comprises a vertical duct having an opening at the upper end and at least one movable member, said movable member being supported in a manner to be tilted and an area of opening at a liquid discharge zone being automatically changed according to a fluctuation in a fluid load.

Heretofore, various trays for a fluid contactor apparatus have been used for distillation, absorption, extraction and other contacting operations, and most of the trays are provided with dowmcomers. These conventional downcomers have been regarded as a pipe which connects the upper tray to the lower tray or as a passage for the descending liquid. The downcomers have structures of vertical pipes or ducts. However, the mechanism of the conventional downcomer has several disadvantages. For example, since the downcomer has been so far regarded as a passage for the descending liquid which connects the upper tray to the lower tray, the downcomer must be assembled in such a structure that the lower end of the downcomer is sealed by the liquid held on the lower tray and a definite clearance is kept between the lower tray and the lower end of the downcomer. Therefore, a high precision is required for setting a relative position of the lower end of the downcomer with respect to the level of the lower tray and fixing the downcomer to the parts which are to be in contact with the downcomer.

When the descending liquid flows over an effluent weir on the upper tray, and falls through the downcomer, for example, in a gas-liquid contact, a mixed phase develops within the downcomer due to the generation of gas bubbles and inclusion of the generated gas bubbles into the liquid, and therefore a space of definite horizontal cross-sectional area is necessary for the downcomer to lower the rate of discharged liquid to separate or diminish the gas bubbles. The available contact area of the tray is correspondingly reduced and the gas-liquid contact efficiency is also lowered.

Furthermore, in the conventional downcomer, the horizontal cross-sectional area of the downcomer is fixed and thus cannot be changed freely according to the fluctuation in the fluid load. That is, the conventional downcomer usually has a dimension for maximum capacity and therefore the available contact area of the trays in a contactor apparatus becomes smaller. Furthermore, the downcomer must have some definite length including an allowance for sealing the upper and lower trays, and therefore the length of the downcomer cannot be shortened. In other words the distance between the upper tray and the lower tray of the contactor apparatus is sometimes determined by the length of the downcomer.

An object of the present invention is to provide a downcomer for a contactor apparatus, which can be easily fabricated and assembled without paying any rigorous precaution to setting a relative position of the downcomer to the lower tray and parts which are to be in contact with the downcomer.

Other object of the present invention is to provide a downcomer, which can increase the available contact area of the trays.

Another object of the present invention is to provide a downcomer having a high contact efficiency, which can change an area for the descending liquid at the discharging part according to the fluctuation in the contacting fluid load.

As the result of various studies on improvements of disadvantages in mechanism of the conventional downcomer, the present inventors have made an invention of a novel downcomer having such a structure that, when an ascending fluid starts to flow upwards, a passage of the downcomer is closed by a movable member provided on the downcomer, where there is no descending liquid, and the liquid, which starts to flow downwards through the downcomer and accumulates therein by the closure of the passage, can move the movable member from the closed position to the open position according to the liquid level of the accumulated liquid, and the accumulated descending liquid is discharged from the downcomer while automatically controlling the discharging rate of the liquid.

According to the present invention, the outlet of the downcomer, that is, the discharging direction of the downcomer, can be set to any desired direction.

That is, the present downcomer is characterized by such a structure that the downcomer, which is to be provided at a tray, has at least one movable member and forms a vertical passage duct having an opening at the upper end, said movable member being in a position to close or open the passage duct to change an area of opening of the downcomer owing to the level of a liquid accumulated in the downcomer according to the fluctuation in the fluid load.

The present downcomer can be applied to all the fluid contactor apparatuses based on the utilization of trays, for example, bubble cap trays, perforated trays, valve trays, etc.

According to the present invention, the required depth of the downcomer can be determined by a pressure drop of the tray, especially a dry pressure drop of the tray. For example, in the fluid actuator apparatus based on the utilization of valve trays, said dry pressure drop will not exceed some definite value based on the weight of valves throughout almost all the operating range, and the fluid contacting operation can be carried out without any trouble, even if there are some clearances on the trays. Therefore, the depth of the present downcomer can be much shortened, when the present downcomer is combined with the valve trays. Furthermore, the structure of the present downcomer does not necessitate any sealing of the lower end of the downcomer by the liquid held on the lower tray, and therefore no precision is necessary for the position of the present downcomer in respect to the upper and lower trays and the distance between the upper and lower trays. Thus, the present downcomer can be readily and simply fabricated and assembled into the fluid contactor apparatus. This is a remarkable advantage of the present downcomer.

Now, the present invention will be explained in detail, referring to the accompanying drawings.

FIGS. 3 and 4 are vertical cross-sectional views of other embodiments of the present invention.

FIG. 5 is a vertical cross-sectional view of a fluid contactor apparatus in part, where the present downcomers are provided at valve trays.

FIGS. 6, 7 and 8 show vertical cross-sectional views of another embodiments of the present invention.

Figure 1:
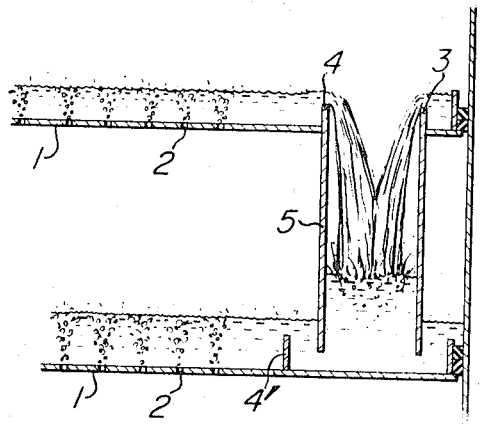
FIG. 1 is a vertical cross-sectional view of a fluid contactor apparatus in part, where the conventional downcomer is provided at the perforated tray.

In FIG. 1, the conventional downcomer 5 is provided at an upper perforated tray 2 with rim 3, where the upper end of the downcomer 5 forms a weir 4 and the lower end of the downcomer 5 is lower than the level of a weir 4' for holding a sealing liquid on the lower tray 1', and is immersed into the liquid held on the lower tray 1'. The ascending fluid moves upwards through perforations 2 and contacts the liquid held on the tray 1, whereas the liquid held on the tray 1 flows over the weir 4 and falls through the downcomer 5 down to the lower tray 1', where the liquid is distributed and again contacted with the fluid ascending through the perforations 2'.

Figure 2:
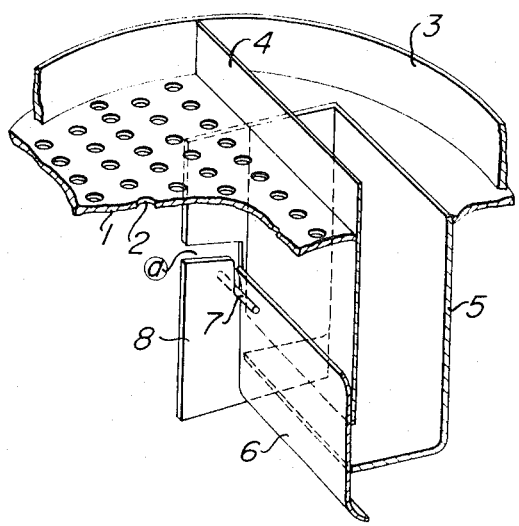
FIG. 2 is a schematic view of one embodiment of the present downcomer provided at the perforated tray.

In FIG. 2, numeral 1 is a tray, 2 perforations on the tray, 3 a rim, 4 an effluent weir, 5 a downcomer of a box-type duct of oblong rectilinear cross-section having an opening at the upper end and a bottom at the lower end. The downcomer is fixed to the tray. A movable piece 6 is connected with the lower projected end of the weir 4 and supported through an engagement of supporting rods 7 fixed to the movable piece with the cut-away recesses ⓐ of the side faces 8 of the downcomer in a pivotally movable manner. The movable piece 6 can be supported in a pivotally movable manner as shown in FIG. 2, or through an engagement of mutually cutaway recesses or through hinges or flexible connections. The lower end of the movable piece 6 is curved towards the column wall at the upstream side on the lower tray, as shown in FIG. 2. Such curved structure is very effective for directing the discharging direction of the descending liquid to the column wall side thereby to prevent development of a mixed gas-liquid phase or prevent inclusion of the gas bubbles in the liquid. Furthermore, a space of the lower tray for receiving the descending liquid from the downcomer can be remarkably saved and at the same time a wider available contacting area can be obtained thereby. Therefore, a more stationary and better gas-liquid contact can be effectively attained.

In the present downcomer, the movable piece is in a closed state where there is no liquid level due to the accumulation of the descending liquid within the downcomer, but when the pressure on the bottom side of the downcomer is increased with an increase in the liquid level, that is, the increased amount of the descending liquid accumulated within the downcomer, the movable piece 6 is pushed outwards from the closed position by the load applied thereto, which corresponds to the level of the accumulated liquid within the downcomer, and the bottom side of the downcomer is put into an open state.

The area of opening of the movable piece 6 at the bottom side of the downcomer depends upon the amount of the liquid accumulated within the downcomer, and its opening can be automatically controlled.

In FIG. 3, another embodiment of the present invention is shown, where a downcomer comprises a pair of fixed parallel plates 9, a fixed member 11 integrated with an effluent weir 10 on the tray 13, and a movable piece 14, whose upper end is supported at the tray 13 in a manner to be tilted by a suitable hanger 12.

In FIG. 4, still another embodiment of the present invention is shown, where a downcomer fixed to the trays 15 and 15' is in a box-like structure comprising fixed members 17 and 18, a pair of side members 19 and a movable L-shaped piece 16 at the bottom. A position near the center of said movable piece 16 is supported at the lower end of said fixed member 17 in a manner to be tilted by a suitable support 20.

The area of opening of the movable piece 16 at the bottom of the downcomer is adjustable according to the amount of a liquid which flows over the weir 21 integrated with the fixed member 17, falls through the downcomer and is accumulated within the downcomer. In this case, it is desirable to make the position of pivots of the movable piece deviate from the center thereof so that a moment may act in a direction to close the bottom of the downcomer.

In FIG. 5, each tray 22 is provided with valves 23 which are actuated when a fluid passes through the perforations for mounting the valves, and a downcomer comprises a part of column side wall 27, a bottom plate 26 projected inwardly from the column side wall 27 and a movable piece 25 supported at the tray 22 in a manner to be tilted by a suitable support 24. In this embodiment, the movable piece 25 and the effluent weir 28 are integrated together, and the downcomer can be very simply assembled by utilizing the column side wall 27.

In FIG. 6, a downcomer comprises side plates 29, movable pieces 30 and 30', which are positioned between the side plates in contact with the side plate and in a direction perpendicular thereto, the movable pieces being suspended at trays 32 and 32' by suitable supporting means 31 and 31'. In this case, the effluent weirs 33 and 33' are integratd with the movable pieces 30 and 30', respectively. The movable pieces 30 and 30' are closed by an external pressure developed when a load of ascending fluid is applied thereto, and the downcomer is put into a closed passage. When the inner pressure of the downcomer exceeds the external pressure due to an increase in the amount of the descending liquid accumulated in the downcomer, the movable pieces 30 and 30' are opened to discharge the descending liquid from the downcomer. In this case, it is sometimes desirable to fix weights 34 and 34' to the outsides of the movable pieces, respectively, to facilitate closure of the movable pieces 30 and 30'. In place of the weights, these two movable pieces 30 and 30' can be connected by a spring.

Figure 7:
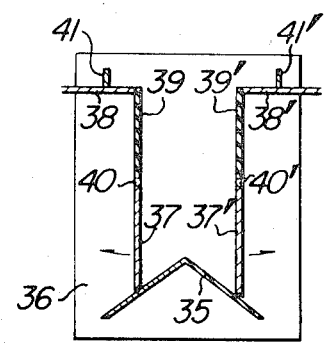

In FIG. 7, an L-shaped piece 35 at the bottom of the downcomer is fixed to side plates 36 as shown in FIG. 6 to engage the movable pieces 37 and 37' in a closed state at an earlier stage and also to distribute the flow of the descending stream in two directions. Said movable pieces 37 and 37' are supported in a movable manner by flexible pieces 39 and 39' supported at trays 38 and 38' and suitable supporting means 40 and 40'. The movable pieces 37 and 37' are inclined outwardly by bending of the flexible pieces 39 and 39', and the opening of the movable pieces can be effected stagewise. Effluent weirs 41 and 41' are comprised of different material from the movable pieces 37 and 37'.

The downcomers as shown in FIGS. 6 and 7 are suitable for double flow trays.

Figure 8:
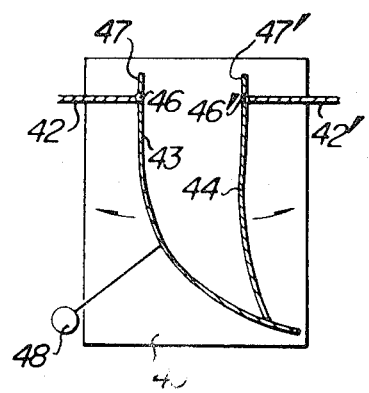

In FIG. 8, a downcomer comprises a pair of fixed side plates 45 and a pair of curved movable pieces 43 and 44 supported at the trays 42 and 42'. The movable pieces 43 and 44 are supported to the trays 42 and 42', respectively, in a manner to be tilted by a suitable supporting means 46 and 46' in contact with the fixed side plates 45, and the upper ends of the movable pieces are integrated with the effluent weirs 47 and 47', respectively. In this case, it is desirable to fix a weight 48 to the outside of the movable piece 43 to facilitate closure of the movable piece 43.

In these downcomers as shown in FIGS. 6 to 8, side plates of the downcomers can be substituted by column walls.

Figure 9:
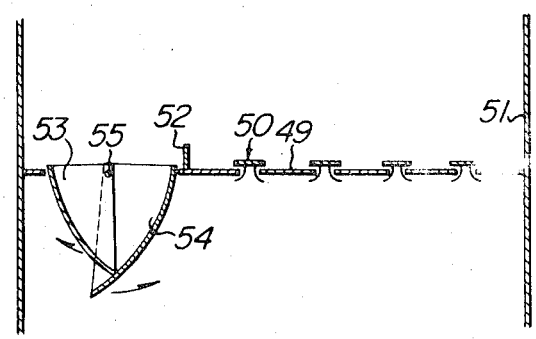
FIG. 9 shows a vertical cross-sectional view of a valve tray provided with the present downcomer.

In FIG. 9, the present downcomer is provided in a tray column with valve trays. In the inside of the tray column, a tray 49 has valves 50, each for each perforation, and is fixed to a column wall 51. At the downstream side of an effluent weir 52 fixed to the tray 49, two movable pieces 53 and 54, whose side faces and bottom faces are curved, are supported in a position opposite to each by a suitable supporting means 55. In this case, the tip end of the movable piece 54 is bent to a beak form to fix the direction of the descending liquid. The movable pieces 53 and 54 can be supported at the outer ends by suitable supporting means.

As described above, the present downcomer can be fabricated and assembled separately for each tray without giving a high precision to a relative position of the lower tray and the lower end of the downcomer, and therefore the mounting operation can be made simpler and working efficiency can be also improved. Furthermore, downcomers can be provided at several positions of one tray, if necessary, to make the descending liquid flow to a desired location of the lower tray in a divisional manner, and enhance the contacting efficiency. Consequently, an available area per tray can be increased, and the contacting apparatus can be made more compact. Furthermore, generation of gas bubbles or inclusion of gas bubbles in the liquid can be effectively prevented by selecting a shape of the lower end of the downcomer to decide the discharging direction of the descending liquid from the downcomer, and a space for receiving the descending liquid from the upper tray, which is indispensable in the conventional tray, can be saved.

The present downcomer is applicable to a fluid contactor apparatus for distillation, absorption, extraction, etc. and can play an important role in enhancing the fluid contacting efficiency in such industrial fields as petroleum refinary, air separation, gas absorption, etc.

What is claimed is:

1. A downcomer for a fluid contactor apparatus having a plurality of horizontal trays positioned therein, which comprises a vertical duct having an opening at an upper end of the duct and at least one movable member that forms a wall of the duct, an upper part of said movable member projecting above an upper surface of one tray and means for tiltably supporting said member from said one tray, a lower discharge area of the duct being adjusted by movement of the movable member due to fluctuation in the fluid load of the apparatus.

2. A downcomer according to claim 1, wherein the duct is comprised only of movable members.

3. A downcomer according to claim 1, wherein the upper part of the movable member provides an effluent weir for said one tray.

4. A downcomer according to claim 3, wherein two opposite side walls of the duct are each formed by a movable member.

5. A downcomer according to claim 3, wherein a lower end of the movable member is curved toward the inside of said duct.

6. A downcomer according to claim 3, wherein a weight is fixed to an outside portion of the movable member whereby said movable member tends to return to a closed position upon reduction of the fluid load of the apparatus.

7. A downcomer according to claim 3, wherein only one side wall of the duct is formed by said movable member.

8. A downcomer according to claim 7, wherein a side wall opposite to the movable member is a column wall of said apparatus.

9. A downcomer according to claim 3, wherein a bottom plate extends horizontally from a fixed side wall of said duct toward said movable member.

10. A downcomer according to claim 9, wherein the movable member extends below said bottom plate.

11. A downcomer according to claim 10, wherein the lower edge of said movable member extends substantially horizontally below said bottom plate.

12. A downcomer according to claim 11, wherein said lower edge is positioned closely subjacent to said bottom plate and said bottom plate is secured to a column wall of said apparatus.

* * * * *